(12) United States Patent
Wang et al.

(10) Patent No.: US 8,826,314 B2
(45) Date of Patent: Sep. 2, 2014

(54) METHOD AND APPARATUS FOR MANAGING QUALITY OF SERVICE

(75) Inventors: Jia Wang, Randolph, NJ (US); Andrea Basso, Marlboro, NJ (US); Min-Hsuan Chen, Holmdel, NJ (US); Zihui Ge, Secaucus, NJ (US); Ajay Mahimkar, Woodbridge, NJ (US); Han Hee Song, San Jose, CA (US); Jennifer Yates, Morristown, NJ (US); Yin Zhang, Austin, TX (US)

(73) Assignees: AT&T Intellectual Property I, LP, Atlanta, GA (US); Board of Regents, The University of Texas Systems, Austin, TX (US)

( * ) Notice: Subject to any disclaimer, the term of this patent is extended or adjusted under 35 U.S.C. 154(b) by 342 days.

(21) Appl. No.: 13/360,828

(22) Filed: Jan. 30, 2012

(65) Prior Publication Data

US 2013/0198767 A1    Aug. 1, 2013

(51) Int. Cl.
*H04H 60/32*    (2008.01)

(52) U.S. Cl.
USPC .................. 725/14; 725/15; 725/16; 725/17; 725/19; 725/20; 702/179; 702/181; 702/182; 702/183; 702/184; 375/240.12; 375/240.27

(58) Field of Classification Search
None
See application file for complete search history.

(56) References Cited

U.S. PATENT DOCUMENTS

| | | | |
|---|---|---|---|
| 7,881,904 B1 * | 2/2011 | Carson et al. | ................. 702/179 |
| 2004/0068398 A1 | 4/2004 | Hands | |
| 2007/0268836 A1 | 11/2007 | Byun | |
| 2008/0317111 A1 | 12/2008 | Davis | |
| 2009/0244289 A1 | 10/2009 | Raake | |
| 2011/0013694 A1 | 1/2011 | Watanabe | |
| 2011/0102601 A1 | 5/2011 | Davis | |

* cited by examiner

*Primary Examiner* — Joshua Taylor
(74) *Attorney, Agent, or Firm* — Guntin & Gust, PLC; Andrew Gust

(57) ABSTRACT

A system that incorporates teachings of the present disclosure may include, for example, obtaining regression coefficients that quantify a relationship between premises feedback and first network and premises performance indicators, obtaining second network performance indicators for the network elements, obtaining second premises performance indicators for the customer premises equipment, and predicting customer complaints by applying the obtained regression coefficients to at least the second network performance indicators and the second premises performance indicators. Other embodiments are disclosed.

10 Claims, 15 Drawing Sheets

| Data set Type | Spatial Level | Description |
|---|---|---|
| Network Performance Indicators | STB | STB audio quality indicators |
| | | STB video quality indicators |
| | | STB syslog |
| | | STB resets |
| | | STB crashes |
| | RG | RG Reboots |
| | IO & CO | SNMP MIBs of routers & switches |
| | SHO & VHO | SNMP MIBs of routers & switches |
| User Interaction Indicators | User | STB power on/off log |
| | | STB Channel change log |
| | | STB Stream control log |
| User Feedback | User | Customer trouble tickets |

FIG. 2b

| Aggregation method | P value in F-test | Correlation coefficient |
|---|---|---|
| CO | 0.00 | 0.6826 |
| Random | 2.21e-31 | 0.7165 |

| KPI Type | KPI Label | β Coef. |
|---|---|---|
| STB packet stat | RTP payload error | 0.68 |
|  | Tuner fill | 0.63 |
|  | Hole Too Large | 0.61 |
|  | Decoder stall | 0.42 |
|  | Bytes processed per sec | -0.32 |
| Audio | Audio decoder errors | 0.84 |
| Video | Video DRM errors | 0.73 |
|  | Video decoder errors | 0.53 |
|  | Video frames decoded | -0.49 |
|  | Video data throughput | -0.49 |

FIG. 9a

| KPI Type | KPI Label | β Coef. |
|---|---|---|
| STB packet stat | Hole without session packets | 0.60 |
|  | Tuner fill | 0.57 |
|  | Bytes processed per sec | -0.34 |
|  | ECM parse errors | 0.32 |
| Audio | Audio decoder errors | 1.03 |
|  | Audio samples dropped | 0.84 |
|  | Audio crypto error | 0.64 |
|  | Audio data dropped | 0.55 |
|  | Audio DRM errors | 0.34 |
| Video | Video DRM errors | 0.63 |

FIG. 9b

| KPI Type | KPI Label | β Coef. |
|---|---|---|
| STB packet stat | Tuner fill | 0.67 |
|  | Src unavailable received | 0.5 |
|  | Hole without session packets | 0.52 |
|  | ECM parse errors | 0.35 |
|  | Bytes processed per sec | -0.33 |
| Audio | Audio decoder errors | 0.74 |
|  | Audio data dropped | 0.57 |
|  | Audio crypto error | 0.44 |
| Video | Video DRM errors | 0.68 |
|  | Video frames dropped | 0.65 |

FIG. 9c

CO with high customer complaints

CO with moderate customer complaints

CO with low customer complaints

METHOD AND APPARATUS FOR MANAGING QUALITY OF SERVICE

FIELD OF THE DISCLOSURE

The present disclosure relates generally to communication systems and more specifically to a method and apparatus for managing quality of service.

BACKGROUND

Communication technologies are transforming the global media services industry, enabling new operators to provide services whilst also enabling a wealth of innovative new IP-based services integrated with more traditional services. However, as the technologies develop, user expectations can change, including increased demand for higher quality of services.

Meeting the demand for quality of service can be complicated by the differing expectations of audience members. This can be further exacerbated by the differing responses by audience members to a perceived poor quality of service.

BRIEF DESCRIPTION OF THE DRAWINGS

FIG. 2b illustrates exemplary data sets that can be collected with the system of FIGS. 1-2a;

FIG. 3a depicts an illustrative embodiment of data flow associated with the communication systems of FIGS. 1-2a;

FIG. 3b depicts accuracy results of an example that utilized the exemplary Q-score system;

FIGS. 4-12 depict graphical representations of parameters associated with the data flow of FIG. 3a and the communication systems of FIGS. 1-2a;

FIG. 13 depicts an illustrative embodiment of a method operating in portions of the systems of FIGS. 1-2a.

DETAILED DESCRIPTION

Figure 1:
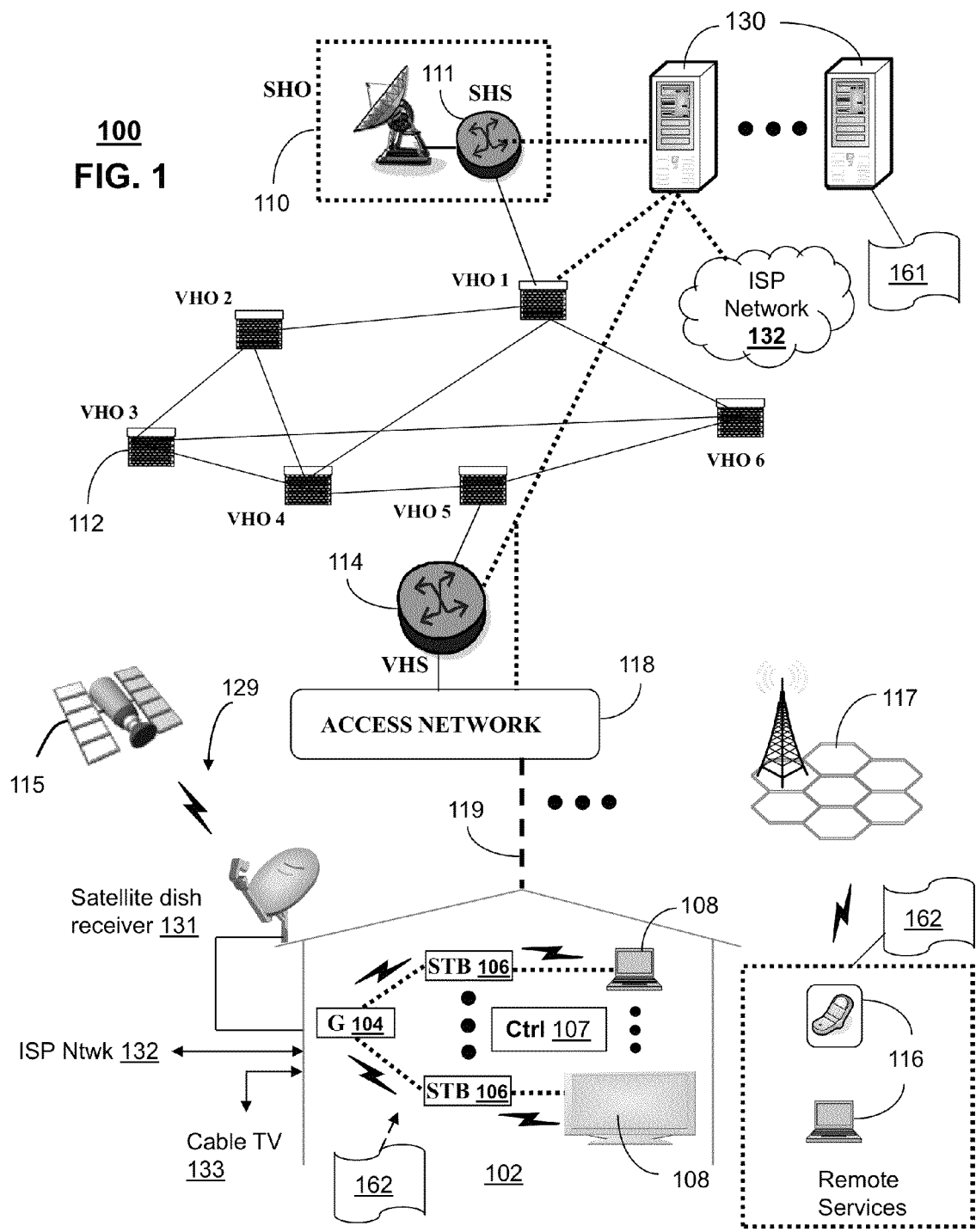
FIG. 1 depicts an illustrative embodiment of a communication system that provides media services.

The present disclosure describes, among other things, illustrative embodiments of systems and methods for determining or approximating a quality of experience through a selected set of performance indicators in a proactive (e.g., detect issues before customers complain) and/or scalable manner. In one embodiment, a service quality assessment framework, Q-score, can be utilized which accurately learns a small set of performance indicators relevant to user-perceived service quality, and proactively infers service quality, such as, for example, in a single score. In one embodiment, Q-score can be evaluated using network data collected from a service provider network, such as an Internet Protocol Television (IPTV) service provider. In another embodiment, Q-score can be utilized to identify and quantify service quality degradation of individual customers before performance impact occurs and/or can be utilized to adaptively allocate customer care workforce to potentially troubling service areas. Other embodiments are contemplated by the present disclosure.

One embodiment of the present disclosure includes a server that has a memory coupled with a controller circuit. The controller circuit can be programmed to obtain first network performance indicators for routers and switches of a network, where the first network performance indicators comprise first processor utilization, first packet count, first packet delivery errors and first discards. The controller circuit can be programmed to obtain first premises performance indicators for set top boxes and residential gateways coupled with the network, where at least some of the routers and switches are used in delivering services to the set top boxes. The controller circuit can be programmed to obtain first user activity information for the set top boxes and obtain premises feedback from complaint information of customer call service records associated with at least some of the set top boxes. The controller circuit can be programmed to determine regression coefficients that quantify a relationship between the premises feedback and the first network and premises performance indicators by utilizing statistical regression analysis on at least the first network performance indicators, the first premises performance indicators, the first user activity information and the premises feedback. The controller circuit can be programmed to obtain second network performance indicators for the routers and the switches, where the second network performance indicators comprise second processor utilization, second packet count, second packet delivery errors and second discards. The controller circuit can be programmed to obtain second premises performance indicators for the set top boxes and the residential gateways and obtain second user activity information for the set top boxes. The controller circuit can be programmed to predict customer complaints by applying the regression coefficients to at least the second network performance indicators, the second premises performance indicators and the second user activity information.

One embodiment of the present disclosure includes a non-transitory computer-readable storage medium comprising computer instructions, which when executed by a processor cause the processor to obtain first network performance indicators for network elements of a network and obtain first premises performance indicators for customer premises equipment coupled with the network, where at least some of the network elements are used in delivering services to the customer premises equipment. The computer instructions can enable obtaining premises feedback from customer feedback information associated with at least some of the customer premises equipment and enable quantifying a relationship between the premises feedback and the first network and premises performance indicators. The computer instructions can enable obtaining second network performance indicators for the network elements and obtaining second premises performance indicators for the customer premises equipment. The computer instructions can enable predicting customer complaints by applying the quantified relationship to at least the second network performance indicators and the second premises performance indicators.

One embodiment of the present disclosure is a method that can include obtaining regression coefficients that quantify a relationship between user feedback and first network and user-device performance indicators, where the regression coefficients are obtained by a server. The first network performance indicators can be for network elements of a network. The first user-device performance indicators can be for customer equipment that communicates over the network. The user feedback can be associated with at least some of the customer equipment. The method can include obtaining, at the server, second network performance indicators for the network elements. The method can include obtaining, at the server, second user-device performance indicators for the customer equipment. The method can include predicting customer complaints by applying the obtained regression coefficients to at least the second network performance indicators and the second user-device performance indicators.

FIG. 1 depicts an illustrative embodiment of a first communication system 100 for delivering media content. The communication system 100 can represent an IPTV media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other wide area wireless network technologies can be used with the exemplary embodiments.

Communication system 100 can also provide for all or a portion of the computing devices 130 to function as a quality control server (herein referred to as server 130). The server 130 can use common computing and communication technology to perform, or execute, function or software 161. Function 161 can include, among things, obtaining first network performance indicators associated with network elements such as routers and switches. The first network performance indicators can include CPU utilization, packet count, packet delivery errors and/or discards. Function 161 can also include obtaining first customer performance indicators (e.g., premises performance indicators) for customer equipment including customer premises equipment such as media processor 106 and/or gateway 104. Function 161 can include obtaining first user activity information for the customer equipment, such as first power status, first channel switching, first video streaming control and/or first screen menu invocation. Function 161 can include obtaining feedback (e.g., premises feedback), such as complaint information of customer call service records associated with at least some of the media processors 106.

Function 161 can include determining a relationship (e.g., quantifying such as through utilizing regression coefficients) between the feedback and the first network and customer performance indicators. Function 161 can include obtaining second network performance indicators for the network elements, obtaining second customer performance indicators for the customer equipment and/or obtaining second user activity information for the customer equipment. Function 161 can include predicting customer complaints utilizing the determined relationship (e.g., the regression coefficients) as applied to at least the second network performance indicators, the second customer performance indicators and/or the second user activity information. Function 161 can include providing workforce distribution information based on the predicted customer complaints.

Server 130 can enable a proactive approach to obtaining comprehensive views of users' quality of experience. Server 130 can be utilized for detecting service issues that matter to customers so that service providers can rapidly respond to the issues to allow for a high-quality customer experience. Server 130 enables assessment of collected data that is associated with the network and the customer in order to effectively manage service offerings and detect and respond to issues prior to customer complaints. Server 130 can also be utilized for effective dimensioning of the customer care workforce in anticipation of a large volume of user complaints should customer-impacting conditions arise. In one embodiment, server 130 can utilize network measurements to infer customer service experience.

The customer equipment, which can include premises equipment such as media processor 106 and/or gateway 104 or other customer equipment such as mobile devices including devices 116, can use common computing and communication technology to perform, or execute, function or software 162. Function 162 can include, among things, providing performance indicators or information indicative of such indicators to the server 130, including video throughput, receiver transport stream errors, codec errors, digital rights management errors, viewing duration of channels, reboot logs, program message logs and/or event logs (e.g., crash and reset event logs). Function 162 can include providing user activity information to the server 130, including power status (e.g., on or off), channel switching, video streaming control and/or screen menu invocation.

System 100 can utilize a Q-score for proactive assessment of users' quality of experience. In one embodiment, Q-score can construct a single quality of experience score using performance metrics collected from the network and/or customer equipment. In one embodiment, Q-score can include at least two components: (i) offline learning of the association between the service quality of experience and the network performance metrics collected, such as from the servers, routers, switches and/or customer or premises equipment; and (ii) online computation of the score for individual users or groups of users. In one embodiment, Q-score can capture the quality of experience by users (e., in real-time or otherwise) and can provide service providers with rapid notification of service issues, such as giving them a lead time of several hours before a user(s) complains to a call center.

In one embodiment, a Q-score generated by system 100 can utilize customer complaints (e.g., tickets) to provide feedback regarding issues that concern customers. Due to the inherent difference between network-level performance indicators and user-perceived quality of service, associating the two may not occur naturally. One or more of the exemplary embodiments can account for various issues in associating user feedback with performance or other indicators. User feedback can be noisy, incomplete and delayed. Some users issue a complaint immediately after they observe a service quality degradation; while others may take hours to complain. Similarly, different users have different tolerance levels to service quality issues—one user may complain repeatedly regarding issues that another user may barely notice. Furthermore, the amount of delay in reporting service quality issues is variable. Depending on situations such as the individual viewer's living schedule or the severity of the issue, there can be large variances between the beginning of service quality issues and reporting times. The Q-score, based on the various indictors described above and the regression analysis that is performed, can account for these issues.

In one embodiment of system 100, from a network perspective, a service provider can collect fine-grained measurements from the network elements such as routers and servers (e.g., real-time syslogs, and regular polls of SNMP performance counters such as CPU utilization, memory, packet counts, and losses). Some performance measurements inside the premises (e.g., a home or commercial facility) may be fine-grained (e.g., residential gateway events), whereas others may be coarse grained (e.g., hourly or daily summaries of STB events). In one or more embodiments, STB data collection can be intentionally not fine-grained to minimize the potential of service disruption due to measurements and due to the massive scale of the measurement infrastructure that would be required. The diversity in the granularity of performance measurements can be accounted for by one or more of the exemplary embodiments described herein.

In one embodiment of system 100, a Q-score system (e.g., implemented in part through use of server(s) 130) can be utilized for proactively assessing quality of experience for IPTV users. In one embodiment, the Q-score system can utilize a multi-scale spatio-temporal statistical mining technique for computing a single score capturing the quality of experience. By performing spatio-temporal aggregation and multi-scale association of the user feedback with performance metrics (e.g., network performance indicators), the Q-score system can identify a desired set of metrics that is useful for accurately quantifying the quality of experience. In one embodiment, the Q-score system can be utilized to identify important key performance indicators (KPIs) that are statistically associated with the quality of experience, to predict bad quality of experience to users and generate alerts to an operations team, and/or effectively dimension a customer care workforce to dynamically allocate repair personnel to service regions as they experience issues for conducting root-cause diagnosis and rapid repair.

Figure 13:
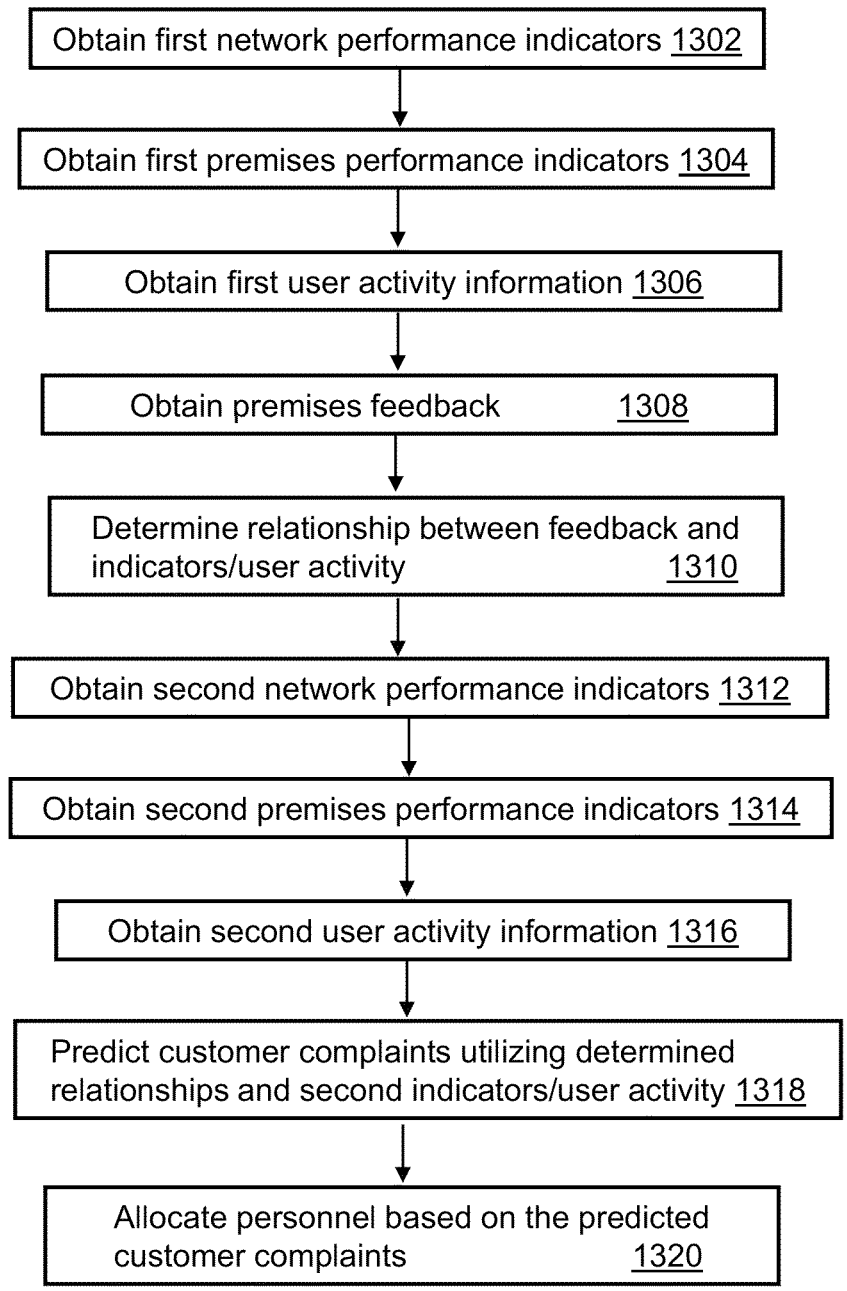

Illustrative embodiments of method 1300 shown in FIG. 13 can be applied to portions of the devices of FIG. 1.

Figure 2A:
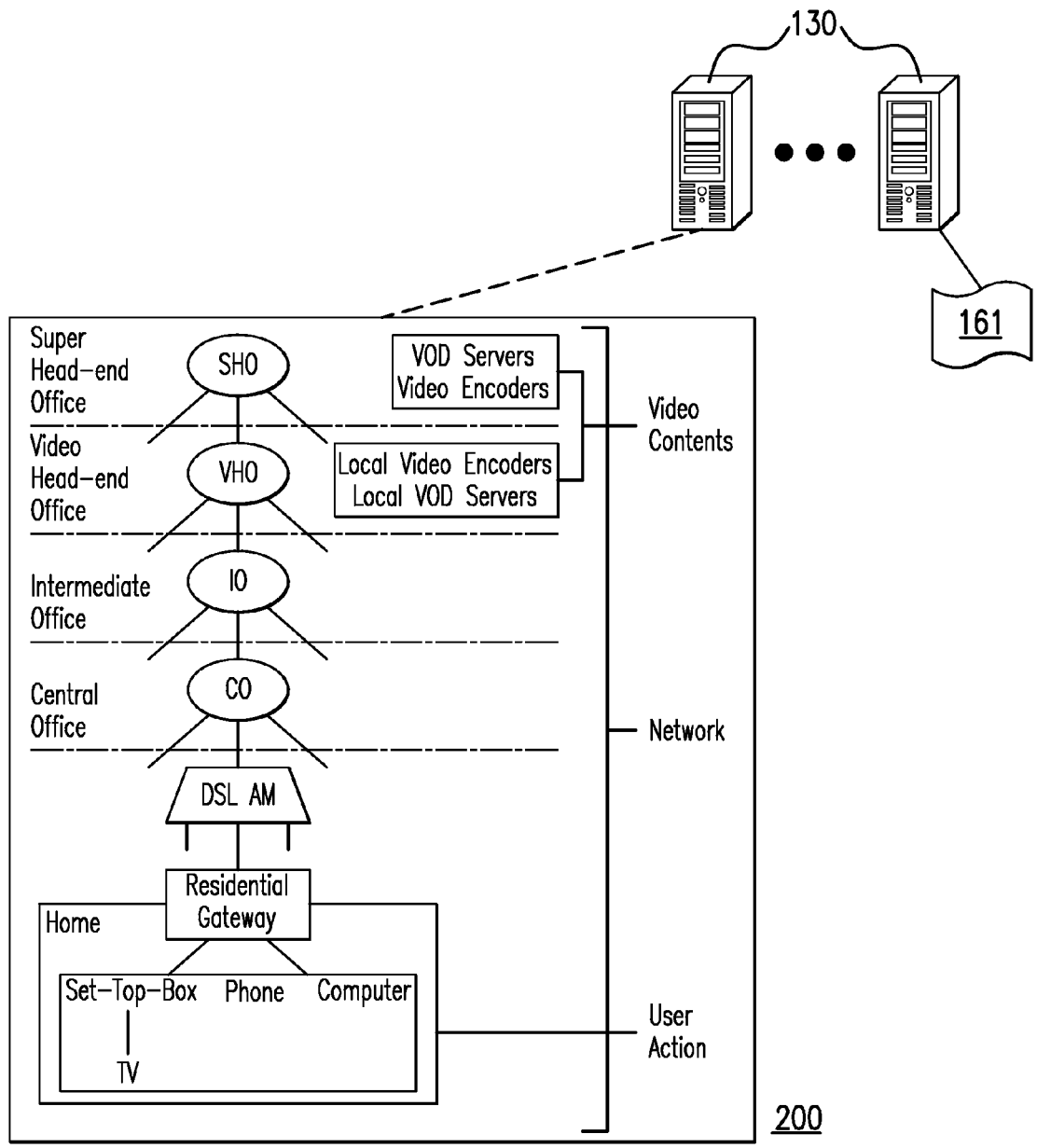
FIG. 2a depicts an illustrative embodiment of another communication system that provides media services.

Referring generally to FIG. 2a, a schematic overview of a portion of an IPTV system 200 is illustrated. System 200 can be overlaid or operably coupled with communication system 100 as another representative embodiment of communication system 100. The service network of system 200 can exhibit a hierarchical structure where video contents are delivered from the servers in a core provider network to millions of STBs within premises or home networks such as via IP multicast. Specifically, either SHO which serves as the primary source of national contents or VHOs which govern local contents at each metropolitan area can encode, packetize and/or send the media content (e.g., video and/or audio) towards end users. Depending on the service provider, the content can go through several routers and switches in Intermediate Offices (IOs), Central Offices (COs), DSLAMs, and Residential Gateways (RGs) before reaching STBs where the packetized content gets decoded and displayed on the TVs. All of the network entities comprising IPTV service, can log KPIs such as delivery status of data and health diagnostics.

In one embodiment, Data can be collected for an IPTV service provider (e.g., via server 130), which has customers spread throughout different time-zones. The data set can include (i) network performance indicators, (ii) user behaviors and activities, and (ii) user feedback in the form of customer complaints. Timestamps can be normalized in all data sets (e.g., to GMT) to accurately and effectively associate the user feedback with performance metrics and user behaviors. In one embodiment, the network performance indicators can be categorized into two parts: (i) provider network performance indicators, which are collected from routers and switches in SHO, VHO, IO, CO of the IPTV service provider as shown in FIG. 2a and (ii) premises or home network performance indicators, which are collected from components inside users' premises or homes (e.g., RG and STB). While this exemplary embodiment describes application of the quality of experience methodology to customer equipment in a premises, the exemplary embodiment(s) can include application of the methodologies or portions thereof to other customer equipment that may or may not be co-located at a premises, including mobile devices, communication devices in a vehicle and so forth. For the provider network performance data, Simple Network Management Protocol (SNMP) Management Information Bases (MIBs) can be collected from every router and switch, or a portion thereof, in the SHO, VHO, IO, and/or CO. For example, the SNMP MIBs can report five minute average performance statistics of CPU utilization and fifteen minute average summaries for packet count, packet delivery errors and discards.

In one embodiment, from the home network side, data relevant to STBs and RGs can be collected. STBs can record audio and video streaming related information including video throughput, receiver transport stream errors, codec errors, DRM errors, and/or viewing duration of TV channels. The video streaming-related information can be reset when the TV tuner clears its buffer by switching channels. While each STB can log all the TV viewing information at all times, in one embodiment, polling servers may only take a subset of the STBs' statistics at each polling interval (e.g., due to high volume of audio and video log and traffic overhead during data delivery). This embodiment can utilize a sampled set of STBs, but the number of STBs utilized can vary. In one embodiment, STB syslog information can be collected that contains hardware and software information such as hard disk usage and memory usage, data delivery status including packet error rate and buffer usage. The diagnostic information can be collected similar to collection of the STB audio and video log, (e.g., polled by collection server in round robin fashion). In one embodiment, crash and reset events log from each STB can be collected. The crash events logs can include unexpected rebooting of STBs due to software malfunctions and the reset can include intentional and scheduled reboots commanded by network operators due to, for instance, software updates. In one embodiment, the crash and reset logs can be periodically collected from all STBs, such as with millisecond scale time stamps. In one embodiment, reboot logs of RGs can be collected that are commanded by operators remotely. RG reboot logs can be collected in a similar fashion as the STB logs. It should be further understood that the exemplary embodiment can limit the collection of data to only the network components and customer components described herein or can collect data from or associated with more or less than the identified components.

Because IPTV networks can be highly user-interactive systems, certain user activity patterns or habits can create overload conditions on the STB and can cause a service issue (e.g., a user changing channels too frequently may cause its upstream device such as a DSLAM to be overwhelmed leading to inability in handling all the remaining STBs that it serves). In one embodiment, user activities are another factor that can be considered by the exemplary analysis. Logs can be collected from every STB, or a portion thereof, to capture four types of user activities performed: (i) power on/off: this can be the result of the user pressing the power button to turn on or off the STB; (ii) channel switch: this can be the result of one of the three actions—target switching by directly inputting the channel number, sequential scanning by pressing the Up/Down button, or pre-configured favorite channel list; (iii) video stream control: this can include actions such as fast forward, rewind, pause and play that are performed on either live TV streams, VoD, or DVR; and (iv) on-screen menu invocation: this log can save the user action of pulling up the STB menu displayed on TV screen that lets the users to access the features provided by the IPTV system.

In one embodiment, user feedback can be accessed via complaints made to a customer care center of an IPTV service. Customer care cases are records of user interactions at call centers. A customer call can be related to service provisioning, billing and accounting, and/or service disruption. Users' reports on service disruptions that later involved technical support can be utilized for the user feedback. Each customer complaint related to service disruption can include a user ID, report date and time, brief description of the problem, and/or resolution of the issue. In one embodiment, this information can be parsed and analyzed by one or more computing devices to determine a subject matter of the user feedback (e.g., without user intervention utilizing language engines and language and rhetorical content libraries). A summary of exemplary data sets that can be collected is shown in FIG. 2b. It should be understood that the data sets can include more or less than is illustrated.

System 200 can enable the use of a Q-score to predict user complaints or other undesired conditions. An association or relationship between noisy, incomplete, and/or indeterminately-delayed user feedback and the various performance indicators (including data from the servers, transport and in-home devices) can be determined through an offline learning process, and then that knowledge can be used in a transform implemented via an online run-time system that estimates/predicts user-perceived service quality based on the available network KPIs.

Figures 3A, 3B:
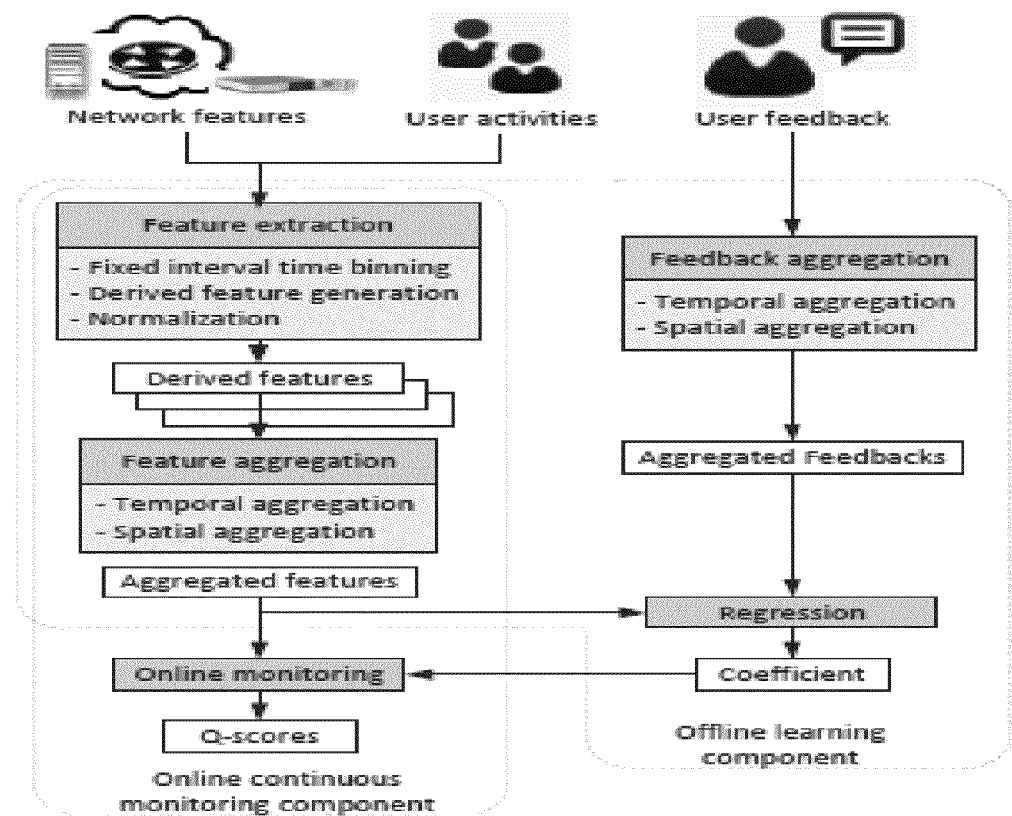

Referring additionally to FIG. 3a, data flow for the system 200 that can be used in generating Q-score according to one exemplary embodiment is shown. A Q-score can take input from the performance indicators (which are referred to as features herein), the user control activities, and the user feedback in the form of customer call service records. The output can be a series of Q-scores, one for each user in service that can quantify the received service quality. System 200 can include an (i) offline learning component(s) and (ii) online monitoring (e.g., continuous) component(s). The overall dataflow in the Q-score system can begin with the offline relationship learning between user feedback on service quality and the measurements from network features and user activities. A desired and available channel for discovering user-level service quality issue can be through use of the lossy, noisy and indeterminately-delayed calls to customer care centers. System 200 can utilize the appropriate temporal and spatial aggregations to remedy the inherent loss, noise and delay with user feedback. By applying statistical regression over large quantity of historical data between various network KPIs and the user feedback, a set of regression coefficients can be obtained or otherwise determined which quantitatively capture their relationship. These regression coefficients can be provided to the online monitoring component. With the regression coefficients, the up-to-date network KPI measurements can be converted or otherwise adjusted into a numerical score (e.g., a single numerical score) for each user or groups of them within a given spatial region. The numerical score, (e.g., the Q-score) can capture the likelihood of any on-going service quality problem. Tracking the Q-score over time can enable execution of a number of different service management applications.

In one embodiment, on each of the network performance indicators and user interaction indicators, a series of transformations can be applied to obtain a measurement matrix. In one embodiment, the data can be converted to fixed-intervaled time bins. For example, network measurement data collected from different sources and devices may be associated with different time periods, posing challenges in correlating them. Some datasets, such as CPU level of routers in SNMP MIBs, contain periodically collected measurement data, and the value represents the average or total over the measurement interval. Some other datasets, such as user activities at the STB and STB crash logs, can include events that take place at a single point of time, rendering them intermittent and having zero duration. Datasets, such as STB audio and video quality indicators, can include data polled either on demand or at irregular intervals and represent the cumulative counters over a variable time interval (e.g., due to channel switches clearing the diagnostic counter entries). To unify the data representation, a data point can be defined: d(m, l, s, e)=v as composed in a four dimensional specification: (i) metric m∈M where M is a set of metrics such as CPU level of routers and count of video decoding errors at STBs; (ii) location l∈L where L is a set of spatial location identifiers such as a set of users, DSLAMs, or COs; (iii) beginning time for the data binding interval s∈T, where T is the total time window; and (iv) ending time of the data binding interval d∈T, where v is the measurement value that d contains. Note that for measurement data pertaining to a single time point, s=d. The above representation can be comprehensive in capturing various cases of periodical/intermittent or fixed/variable duration measurements. However, it requires a moderate amount of computation to determine the overlaps among the time intervals, which can become prohibitively expensive for a large dataset. In one embodiment, to reduce the complexity, all d(m, l, s, e) can be converted into a fixed-size time interval data representation b(m, l, s, δ) as follows:

$$b(m,l,s,\delta) = \{v | v = d(m,\bar{l},\bar{s},\bar{e}), \text{ where } l = \bar{l} \text{ and } [\bar{s},\bar{e}] \text{ overlaps with } [s, s+\delta]\} \quad (1)$$

where δ is length of the feature time interval. Note that if there exists two or more ds with matching measurement time to [s, s+δ], there could also be multiple identical values for b—making b not well defined. In one embodiment, the following aggregation function is utilized to account for this issue.

In one embodiment, the data can be converted to derived features. For example, to deal with multiple ds colliding into the same b (either due to time bin or spatial aggregation), three types of aggregate data points can be defined, which are referred to as the derived features. The derived features can contain (i) the minimum, (ii) the maximum, and (iii) the average of all the values for b respectively. Formally, $$f_m(m, l, s, \delta) = \min_{\bar{l} \in child(l)} \left( \bigcup (b(m, \bar{l}, s, \delta)) \right). \quad (2)$$

$$f_M(m, l, s, \delta) = \max_{\bar{l} \in child(l)} \left( \bigcup (b(m, \bar{l}, s, \delta)) \right).$$

$$f_a(m, l, s, \delta) = \operatorname*{avg}_{\bar{l} \in child(l)} \left( \bigcup (b(m, \bar{l}, s, \delta)) \right). \quad (3)$$

In this way we can limit the number of derived features to be three regardless of the number of actual readings in b.

In one embodiment, normalization of the derived features can be performed. Network features typically take numerical values, potentially having different signs and across large range of scales. This makes it difficult to assess the significance of their associated coefficient under regression. To deal with the diverse data values, derived features can be normalized to be binary-valued by comparing to a threshold, which is determined depending on the metric and location. Consider a vector of features of the same metric and location over different time and interval combinations:

$$\vec{f}_a(m,l) = \langle f_a(\bar{m},\bar{l},s,\delta) \text{ where } m = \bar{m}, l = \bar{l} \rangle \quad (4)$$

A threshold value for τ can be identified for $f_a$. To do so, the user feedback in the form of user complaint logs can be utilized. The conditional distribution function of the metric value of interest can be considered when (1) there is one or more entries of the user complaint log being associated with the location l and when (2) there is no such entry. A threshold τ can separate the instances between case 1 and 2. When threshold τ is low, the chance of having instances in case 1 passing the threshold increases, and when threshold is high, the chance of having instances in case 2 failing the threshold increases. The threshold τ can be set such that the two factors balance out. Using empirical CDFs of the case 1 ($F_1$) and case 2 ($F_2$), τ can be defined such that $$F_1(\tau) = 1 - F_2(\tau). \quad (5)$$

Once τ is determined, normalization of $f_a$ can be performed as follows.

$$f_a(m, l, s, \delta) = \begin{cases} 1 & \text{if } f_a(m, l, s, \delta) >= \tau \\ 0 & \text{otherwise.} \end{cases} \quad (6)$$

Features $f_m$ and $f_M$ can be normalized in the same way.

In one embodiment, a measurement matrix can be constructed from the processed data. In order to support multi-scale analysis that accounts for the indeterminate delay in user feedback, a regression input matrix X can be constructed over all measurement metrics, location, and time parameters as below.

$$X = \begin{bmatrix} \begin{bmatrix} f_m(m_1, l_1, s_1, \delta) & f_M & f_a \\ f_m(m_1, l_1, s_2, \delta) & f_M & f_a \\ \vdots & \vdots & \vdots \\ f_m(m_1, l_1, s_t, \delta) & f_M & f_a \\ f_m(m_1, l_2, s_1, \delta) & f_M & f_a \\ f_m(m_1, l_2, s_2, \delta) & f_M & f_a \\ \vdots & \vdots & \vdots \\ f_m(m_1, l_2, s_t, \delta) & f_M & f_a \\ \vdots & \vdots & \vdots \end{bmatrix} \begin{bmatrix} f_m(m_2, l_1, s_1, \delta) & f_M & f_a \\ f_m(m_2, l_1, s_2, \delta) & f_M & f_a \\ \vdots & \vdots & \vdots \\ f_m(m_2, l_1, s_t, \delta) & f_M & f_a \\ f_m(m_2, l_2, s_1, \delta) & f_M & f_a \\ f_m(m_2, l_2, s_2, \delta) & f_M & f_a \\ \vdots & \vdots & \vdots \\ f_m(m_2, l_2, s_t, \delta) & f_M & f_a \\ \vdots & \vdots & \vdots \end{bmatrix} \cdots \end{bmatrix} \quad (7)$$

The columns of X represent different metrics of derived features. Thus, each column has f with a unique $m_i$. The rows of X represent all feature values during a specific time ($s_i$, δ) at a specific location $l_j$. Assuming there are n locations, t different time bins, and k different KPI metrics and feature aggregations, the number of rows in X is n×t and the number of columns is k.

In one embodiment, multi-scale temporal level aggregations can be utilized. The time window parameter δ can play an important role in capturing the extend of cause-effect delays. Large δ would include cause-effect relationship with long delay. However, large δ would make it insensitive to dense measurements with short cause-effect delay, as the aggregation weakens the significance of correlation. Since different δ values have advantages over others, a multi-scale analysis approach can be adopted by including multiple time window parameters into our consideration. The matrix representation in Eq. (7) is flexible enough to enable this—we can append in columns the X($δ_i$)s with different time-intervals ($δ_i$).

$$X_{Temp.Comb.} = [X(\delta_1) \ldots X(\delta_v)] \quad (8)$$

where v is the number of different values of the time window parameter.

In one embodiment, multi-scale spatial level aggregation can be utilized. Similar to the temporal aggregation captured by the time window parameter, there can be multiple spatial aggregation levels with IPTV system architecture. Based on the hierarchical structure in FIG. 2a, three different spatial aggregation levels can be considered in Q-score, namely user, DSLAM, and CO levels.

In one embodiment, single-scale spatial level aggregation can be utilized. The baseline spatial aggregation level can be set per user aggregation because the service complaint logs are associated with a household, which can be considered as a user. Matching the network features to the household/user level, one of the following processing can be utilized: (i) for features at finer grained spatial level than user (such as STB related features since one household may have multiple STBs), the maximum can be taken among different feature values for the more specific locations as the representation for $f_M$, the minimum for $f_m$ and the average for $f_a$, at the user level; (ii) for features with coarser grained spatial level than user (such as DSLAM and CO), the coarser grained feature values can be replicated for each associated user within the hierarchy. In this way, the number of samples can be preserved at n×t in each row of $X_{user}$. The same spatial level aggregation can be applied for DSLAM level and CO level to obtain $X_{DSLAM}$ and $X_{CO}$ respectively.

In one embodiment, in parallel with the multi-scale analysis with respect to time window parameter, different spatial aggregation levels can be fed into a regression analysis. The most prominent feature can be at a suitable spatial aggregation level and may dominate the same features aggregated at other spatial levels. We can append in column the feature matrices for different spatial levels to obtain:

$$X_{Spat.Comb.} = [X_{userID} X_{DSLAM} X_{CO}] \quad (9)$$

In one embodiment, feedback aggregation can be performed. User complaint logs, such as through customer service calls, can be utilized as the user feedback regarding service quality. However, this feedback may be inherently unreliable. It may be incomplete as not all service quality problems (e.g., video glitches) may be noticed by user—when the user is not actively watching the TV for example. Different users vary in their tolerance level of video problem and in their readiness to call customer service to report/complain about the problem, making this feedback very noisy. Furthermore, users may not pick up the phone at the first sight of the service quality degradation. There can be an indeterminate delay ranging from minutes to hours to even days between the service problem and the user complaint log entry. All of these issues can be addressed by the exemplary embodiments via a de-noise processing in order for such user feedback to be useful in a statistical application. The same principle applied in the spatio-temporal aggregation can be adopted with respect to network features. For instance, let c be the predicate of the presence of a matching entry in the feedback log(B):

$$c(l, u, \gamma) = \begin{cases} 1 & \text{if } \exists b \in B \text{ during } [u, u + \gamma]; \\ 0 & \text{otherwise.} \end{cases} \quad (10)$$

where u is the beginning time for a feedback binding interval and $\gamma$ is the length of feedback time interval. Once c(l, u, $\gamma$) is defined, the same spatio-temporal aggregation method can be used for the network features on c. In one embodiment, a network event or user activity can always be a cause of user feedback but cannot be an effect. Thus, we set u=s+δ so that when we correlate $c_i$ to $b_i$ we take account of the causal sequence between network (or user activity) events and user feedback. In this example, y can be a vector of feedback for different users over time $$y = [c(l_1, u_1), \ldots, c(l_1, u_t), c(l_2, u_1), \ldots, c(l_2, u_t), \ldots]^T.$$

The length of the vector y can be determined by the number of locations n and the number of time bins t, making it to be n×t which is the same as the row count of X.

Given the measurements of network indicators X and user feedback y, a coefficient vector β that provides a compressed representation of the relationship between X and y can be determined. In one embodiment, optimization can be performed using regression. A baseline regression model of linear regression, however, cannot provide the optimal solution as our system of equation $X_\beta = y$ is over-constrained (e.g., the equation has far smaller number of unknowns than the number of equations (k<<(m*n))). To prevent β from over-fitting due to high variance, Ridge regression can be applied that imposes a penalty λ on complexity of model by minimizing a penalized residual sum of squares RSS as follows $$\min_\beta RSS(\mathcal{D}, \beta) \text{ s.t. } \sum_{i=1}^n \beta^2 \leq s. \quad (11)$$

where D is the set of observed data points $D = x_n, y_n$. We can state this optimization problem in Ridge regression as $$\hat{\beta} = \arg\min_\beta \sum_i \left( y_i - \beta_0 - \sum_{j=1}^p x_{ij} \beta_j \right)^2 + \lambda \sum_{j=1}^p \beta_j^2. \quad (12)$$

The Ridge coefficient β becomes $$\hat{\beta} = (X^T X + \lambda I)^{-1} X^T y. \quad (13)$$

where I is the identity matrix. There are other regression methods that can be utilized, such as $l_1$-norm minimization and logistic regression. However, due to the tens of thousands of equations and thousands of unknowns, $l_1$-norm minimization and logistic regression may take an excessive amount of time in computation or fail to converge to an answer.

In one embodiment, significant KPI weights can be determined. From the β coefficients, KPIs that are more closely related to user feedback can be identified. This involves sorting the regression coefficients by their absolute value and identifying the top N KPIs associated with them. Furthermore, by analyzing the commonality and difference of the same metric across different temporal and spatial aggregation configuration, insight can be attained on how each of these KPIs impact the users' quality of experience specific to the most significant spatio-temporal aggregation.

Once the offline learning of β completes, the available KPIs can be utilized for computing the Q-scores either for individual users or groups of users aggregated spatially depending on the feedback aggregation scheme used. β from the offline learning can be applied to the current network measurement data X to obtain Q-score that estimates per user level service quality. In one embodiment, running continuously as network KPI data streaming into Q-score, the series of Q-scores over time can be tracked. Since Q-scores are real-valued numbers, thresholds for alarming on the Q-scores to operations can be identified. The alarms can be proactively used to predict customer complaints. Threshold-based change detection can be applied on the time-series of Q-scores to generate the alarms.

Example

We compared in an example the number of predicted customer trouble tickets and that of genuine customer trouble tickets and measured the accuracy of prediction of service quality issues by false negative rate (FNR) and false positive rate (FPR). The FNR and FPR are computed per user basis.

$$FNR = \frac{\text{\# of time bins that } Q\text{-score fails to predicts a trouble ticket}}{\text{\# of time bins that have genuine trouble tickets}}$$

$$FPR = \frac{\text{\# of time bins that } Q\text{-score incorrectly predicts a trouble ticket}}{\text{\# of time bins that do not have any trouble ticket}}$$

Note that due to the sparsity in the occurrence of user feedback (e.g., trouble tickets), the number of time bins without any use feedback is orders of magnitude higher than the number of time bins with user feedback in this example.

In our evaluation of one exemplary embodiment of the Q-score system, we used data sets collected from a commercial IPTV network provider in the United States over a two month time period from Aug. 1, 2010 to Sep. 30, 2010. Unless otherwise mentioned, we used 15 days of data collected from Aug. 15, 2010 to Aug. 29, 2010 as the training data set for β and the subsequent 15 days of data collected from Sep. 1, 2010 to Sep. 15, 2010 as the testing data set. In addition, we used multi-scale temporal aggregation of $X_{Temp.Comb}$ combining 6 of 3-24 hours and multi-scale spatial aggregation of $X_{Spat.Comb}$ combining spatial levels of user, DSLAM, CO, and VHO as the default setting. Lastly, we set the default feedback time bin γ to be γ=24 hours. We assigned λ a small positive value within (0, 0.05). While different λ exhibit small difference in accuracy, the optimal λ varied from dataset to dataset. Since the selection of λ is specific to dataset in each test, we present the results with the best λ while omitting to show its actual value.

We begin our evaluation by assessing how well Q-score follows the ground truth of user-perceived service quality. In our evaluation, we utilize user feedback as approximation of a ground truth of user-perceived service quality issues in training and testing Q-score system. The user feedback can be incomplete in reflecting user perceived service quality. In fact, the user feedback may capture a subset of user perceived service quality issues and thus may underestimate the actual occurrences of service performance degradation. Fortunately, major and/or long lasting service performance degradation can be captured by the user feedback. Hence, the computed Q-score may underestimate the actual user perceived performance issues, but it is expected to capture major outages and performance degradation. While Q-score does not perfectly match with the user-perceived service quality at the individual user level, the change or trend in the distribution of Q-score can follow closely with that of the actual service quality degradation at certain spatial aggregation level. In this example, we choose CO as the aggregation level 1. By summing up individual users' feedback within each CO into a single value, we obtain an aggregation vector $S_{actual}$ of user feedback. Since $S_{actual}$ is a spatio-temporal aggregation of user feedback, its element now signifies the level of user-perceived service quality issues. Similarly, by summing up the individual users' Q-score inside each CO into a single value, we can obtain an aggregation vector of Q-scores $S_{estim}$ that signifies our estimated level of user-perceived service quality. To evaluate the significance of the relation between the actual ($S_{actual}$) and estimated ($S_{estim}$) user perceived service quality level, we can run an F-test between them where the null hypothesis $H_0$: r=0 and where $S_{actual}$=r*$S_{estim}$. We find that for the significance level of 0.1, the hypothesis test is rejected, implying that the relation between the two vectors does exist. A Pearson's correlation test also shows relatively high correlation coefficients between $S_{actual}$ and $S_{estim}$, indicating that the relationship between the two is linear. In other words, Q-score follows the user-perceived service quality. Because CO level aggregation represents spatial proximity of user geographical locations, user feedback rates can be different across COs. To evaluate if CO aggregation introduces any bias on the results, we also conduct the same evaluation using a random grouping with the same number of groups as the number of COs and compute aggregation vectors. FIG. 3b summarizes F-test and Pearson's correlation tests results for both CO level aggregation and random grouping based aggregation. The random grouping based aggregation generally shows the same results as the CO level aggregation, supporting that Q-score follows user feedback regardless of how we aggregate users in Q-score computation. In this example, we considered various levels of spatial granularity in the IPTV hierarchy including DSLAM, CO, and VHO levels. Among them, CO level aggregation was selected for the accuracy analysis because it can yield a statistically sound number of user IDs in each CO and enough number of COs to make meaningful comparisons between aggregation vector Ses.

Figure 4:
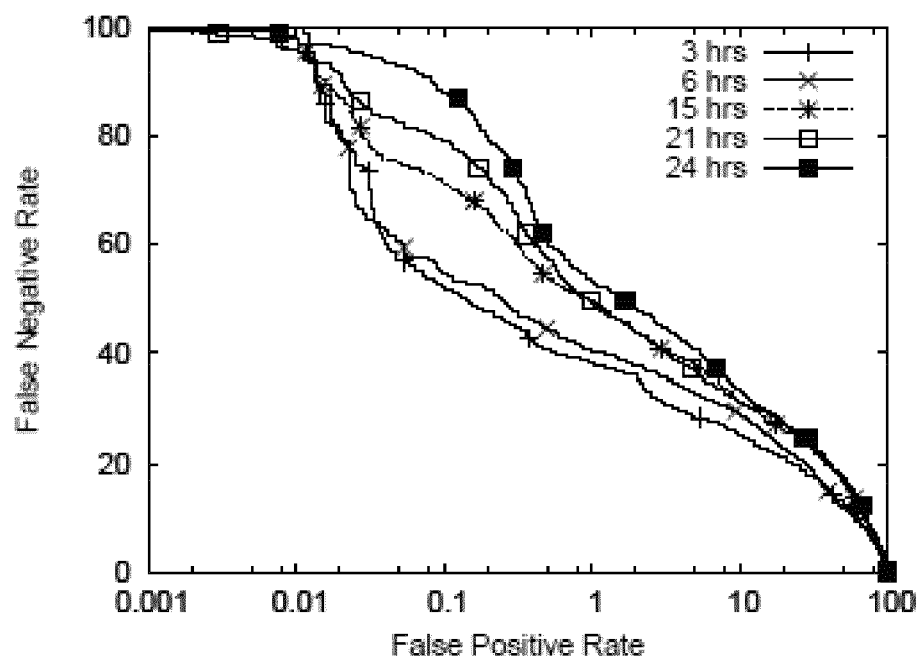
Figure 5:
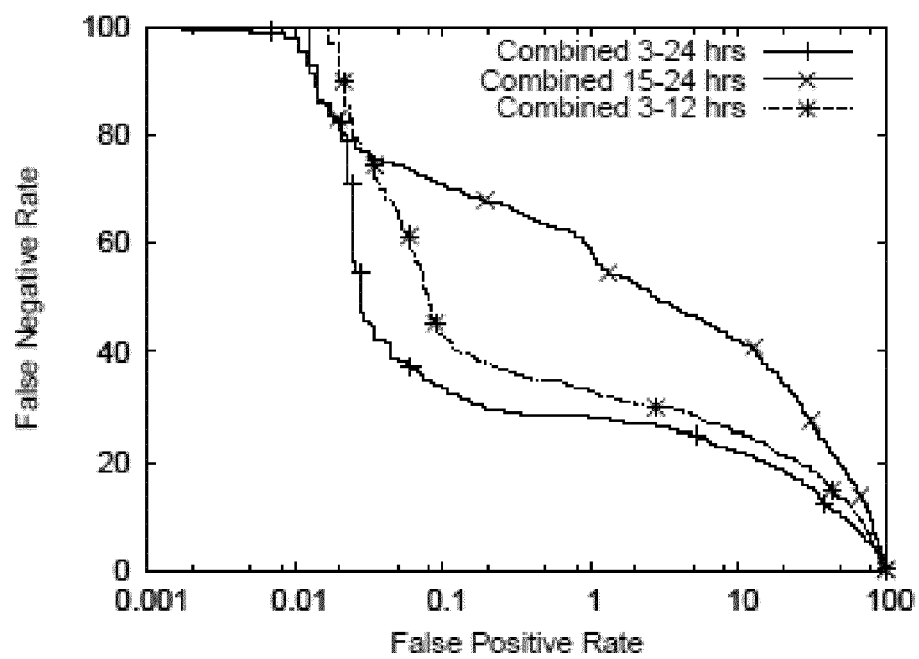

The impact of different timebin size (δ) on network indicators (single-scale temporal level aggregation) can be evaluated in this example. The performance benefits can be shown by using multi-scale temporal aggregation on network performance indicators (multi-scale temporal level aggregation). FIG. 4 shows the Q-score on FPR-FNR trade-off curves using various as ranging from 3 hours to 24 hours (e.g., each curve corresponds to an X with a given δ). Note that FPR shown on the X-axis is in log-scale and FPR shown on the Y-axis is in normal scale. The figure shows that the prediction accuracy gets generally better as we shorten δ (i.e., the curve gets closer to the lower left corner of the plot). However, comparing δ=3 hours and δ=6 hours, their FNR overlaps over different range of FPR, indicating that there is no single optimal δ to be chosen. FIG. 5 shows the results of $X_{Temp.Comb}$ by applying multi-scale temporal aggregation on network performance indicators. There are three curves obtained by combining (i) shorter time bins of 3-12 hours, (ii) longer time bins of 15-24 hours, and (iii) the entire range of 3-24 hours. We observed in our example that (iii) provides the best performance among them. At the same time, (iii) is also strictly better than any curves in FIG. 4, indicating that multi-scale temporal aggregation on network performance indicators improves the accuracy of Q-score prediction on service quality issues.

Figure 6:
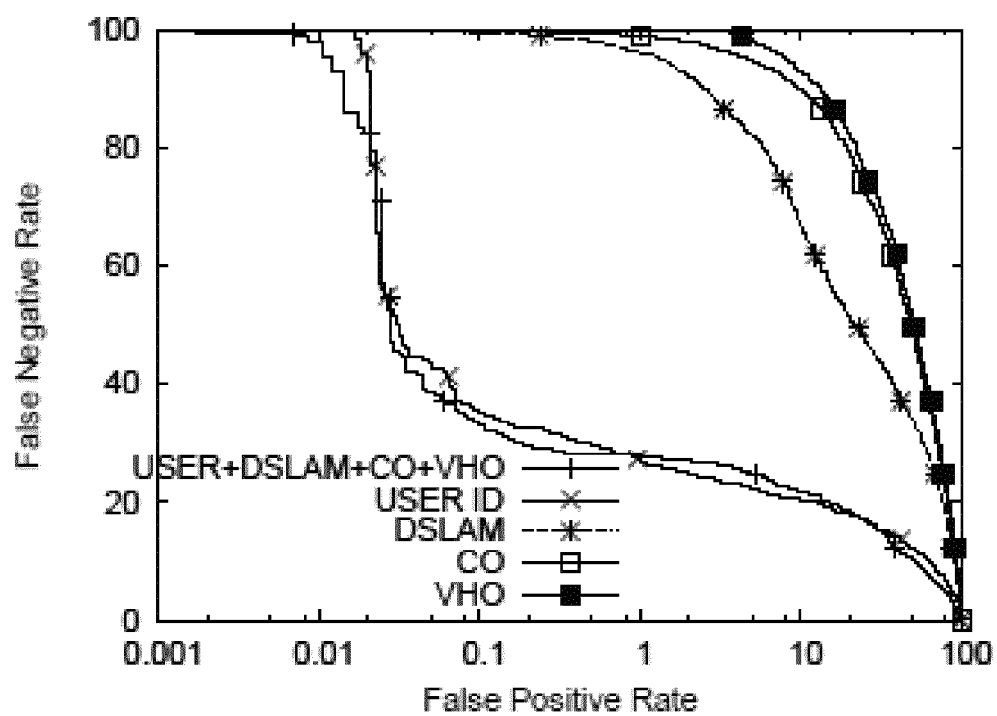

In this example, we can evaluate the impact of various levels of special aggregation on network performance indicators and the benefit of using multi-scale spatial aggregation in Q-score. FIG. 6 shows the trade-off curves of X with various single-scale spatial aggregation ranging from user ID ($X_{userID}$), to DSLAM ($X_{DSLAM}$), to CO ($X_{CO}$), and to VHO ($X_{VHO}$) level. As the spatial aggregation level changes from user ID to DSLAM (e.g., smaller-sized region to larger-sized region), we observe that the FNR increases from 35% to 100% when FPR is at 0.1%. One reason for this is that if the service quality issues reported by users are more related to home network side problem rather than the provider network problem, spatial aggregation of network performance indicators can attenuate signals relevant to the individual users at home network side. By analyzing significant KPIs, we are able to confirm that the significant KPIs are mostly related to STBs and RGs (e.g., home network devices) while the backbone network is suggested to be well provisioned. In addition to the single-scale spatial aggregation, the first plot of FIG. 6 (denoted as 'USER+DSLAM+CO+VHO') shows multi-scale spatial aggregation (with measurement matrix $X_{Spat}$ .Comb). We observe that the multi-scale spatial aggregation outperforms any single-scale aggregation in terms of overall prediction accuracy, indicating that the regression algorithm makes the most accurate selection of spatial level of features.

Figures 7A, 7B:
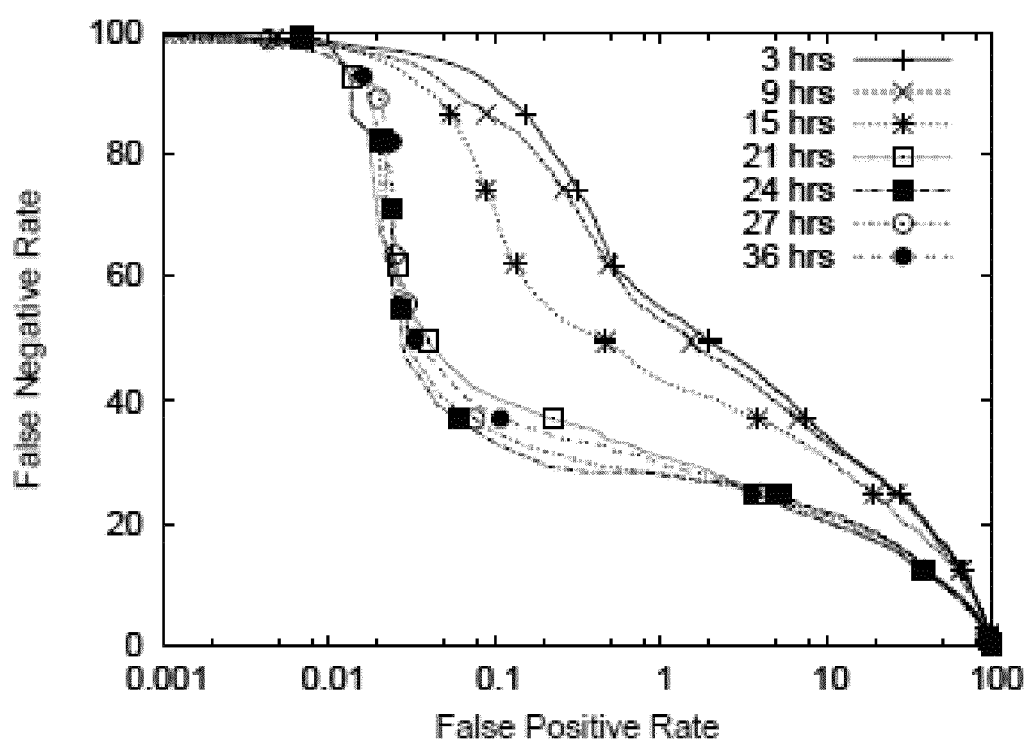

To show the effect of user feedback duration being aggregated together, FIG. 7a compares various lengths of γ. We observe that as γ gets longer, the regression performance gets better. An explanation for this is a significant delay between the occurrence of a problem and the filing of user feedback. Due to the elongated delay, time-bins with short γs may fail to contain feedback correlated with significant network indicator values.

Figure 8:
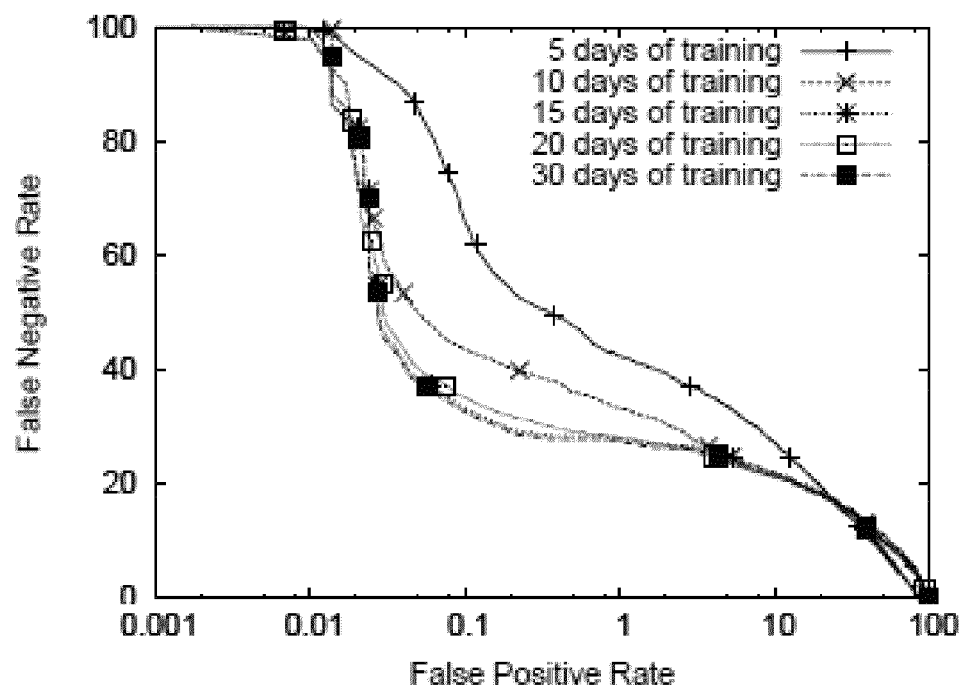

Finally, we evaluate the sensitivity of testing accuracy on the duration of training. In this example, we fix the testing duration and assess how accuracy changes by varying the training duration. FIG. 7b shows the dates of training and testing periods used in our evaluation. FIG. 8 shows the accuracy trade-off curves of using different training durations. We observe that in general, the testing accuracy improves as we increase the training duration. However, the gain becomes marginal once the training duration is longer than 15 days. This result suggests that using 15 days as training period is a good choice. A closer examination on the curves corresponding to the use of 15 and 20 days of training duration reveals that the accuracy of using 15 days training duration is marginally better. One reason for this may be that in the month of August, there was a network-wide STB firmware upgrade. The upgrade that took place between Aug. 10, 2010 and Aug. 14, 2010 could have obstructed measurement of STB logs (e.g., STB audio and video quality measurement logs, syslog, reset and crash logs) and caused learning of β to be affected. Since this kind of glitch in data is common in practice, we take a small amount of noise as granted. In all, we observe that 15 days of training in this example was enough to learn β.

The Q-score system can result in a number of applications for improving service. A set of network KPIs that are closely related to user-perceived service quality can be determined. Q-score can accurately predict user complaints. Workforces can be intelligently dimensioned into troubling regions. A typical IPTV service already supports millions of user devices. If for every single device, few KPIs need to be monitored continuously, the measurement space can easily reach to the order of billions. In addition, time-lapse analysis in the diagnosis (as many diagnosis schemes employs) requires multiple measurements in short periods of time. Thus, the Q-score system can avoid blindly measuring, collecting, and analyzing such large volume of diverse KPIs from the entire network. In one embodiment, a small number of significant KPIs with respect to user-perceived quality of experience can be identified for monitoring and predicting user complaints.

In the example generation of Q-score, we relate the network KPIs and user feedback by means of the factor β. β can measure the relevance of significant KPIs by its magnitude. The analysis of the magnitude of β for different temporal aggregation levels indicates how KPIs correlate with user feedback. FIGS. 9a and 9b list the top ten significant KPIs for relatively long history hours (15-24 hours) and short history hours (3-9 hours), respectively, from the example. Being regressed with individual users' feedback, the significant KPIs can exhibit some commonality (shown in bold for Tuner Fill, Bytes Processed Per Sec, Audio Decoder Errors, Video DRM Errors) as well as differences. From the KPIs relevant to STB packet statistics, we observe that "tuner fill", "hole without session packets", "bytes processed per sec" are particularly interesting KPIs. "Tuner fill" logs the number of packets lost by STBs before they are requested for retransmission. The lost packets are supposed to be retransmitted by D-Servers. Tuner fill counts can be related with video quality in that they indicate the condition of the delivery network and gives a sense of the average packet loss that would occur without any packet recovery scheme. A 'hole' represents time interval greater than a given threshold (assumed to affect video quality) in which no video packets have been received. 'Hole without session packets' counts the number of such holes occurred during a STB's viewing session (since user's last channel change).

On the audio and video related KPIs, "decoder error" logs a rather general type of error occurred during decoding of audio data. Decoder errors can occur due to various situations including, but not limited to, out-of-order data packet reception, audio buffer underrun or overrun, and packet loss. 'DRM errors' and 'crypto error' indicates errors caused by video DRM decoder. This error can occur when encoder packets containing DRM keys are lost. In an IPTV network, every video program can be encoded with DRM, and the inability of decoding DRM blocks viewing of the programs. Thus, the occurrence of this error blocks TV viewing until new encoder keys are received regardless of receipt of the data packets. Lastly, there is 'video frames dropped' error which represents the number of video frames drops (below normal frame rate of 29.97 frames per second) due to packet loss or decoder errors. When large frame drop occurs, viewers can notice choppy or skippy motions. The identification of the important KPIs uncovers information that may be missed in controlled environment analysis. In our case, we discovered that DRM errors are one of the more prominent indicators of video issues and added them to be considered in simulated lab tests that can be utilized in conjunctions with the Q-score methodology described herein.

A comparison can be performed of significant KPIs of long-term event duration (e.g., large δ) and short-term event duration (e.g., small δ). The comparison can indicate that the former tend to have more video related KPIs as the most significant ones, whereas the latter has more KPIs related to audio. This relates with the relevance that audio has with respect to video in the user experience. Being the primary data, audio data is more susceptible to losses and errors than the secondary data, video. The reason can be because the total volume of the data in audio is much less than that of the video, thus the impact of lost or delayed audio data is relatively greater than that of video data. Viewers of the programs can have less tolerance to audio issues than to video issues and can complain about audio issues much earlier than video issues. The contrasting finding in the example between long and short history hours have uncovered that, depending on the characteristics of the issues (e.g., whether the issue is about audio or video), there can be differences in urgency. Another finding from the KPI analysis is drawn from multi-scale temporal aggregation. As shown in FIG. 9c, by combining long-term and short-term event duration δ in regression, we observe both video and audio related issues appear as the most significant KPIs. This further confirms the effectiveness of letting regression algorithm to choose important KPIs among multiple temporal aggregations. Noticing that different KPIs have different degrees of relevancy to user feedback, we can guide monitoring of network KPIs by enlisting a small number of significant KPIs to user-perceived service quality. This way, forthcoming fine-grained network diagnosis can focus on the significant KPIs rather than analyzing excessive amount of KPIs.

Figure 10:
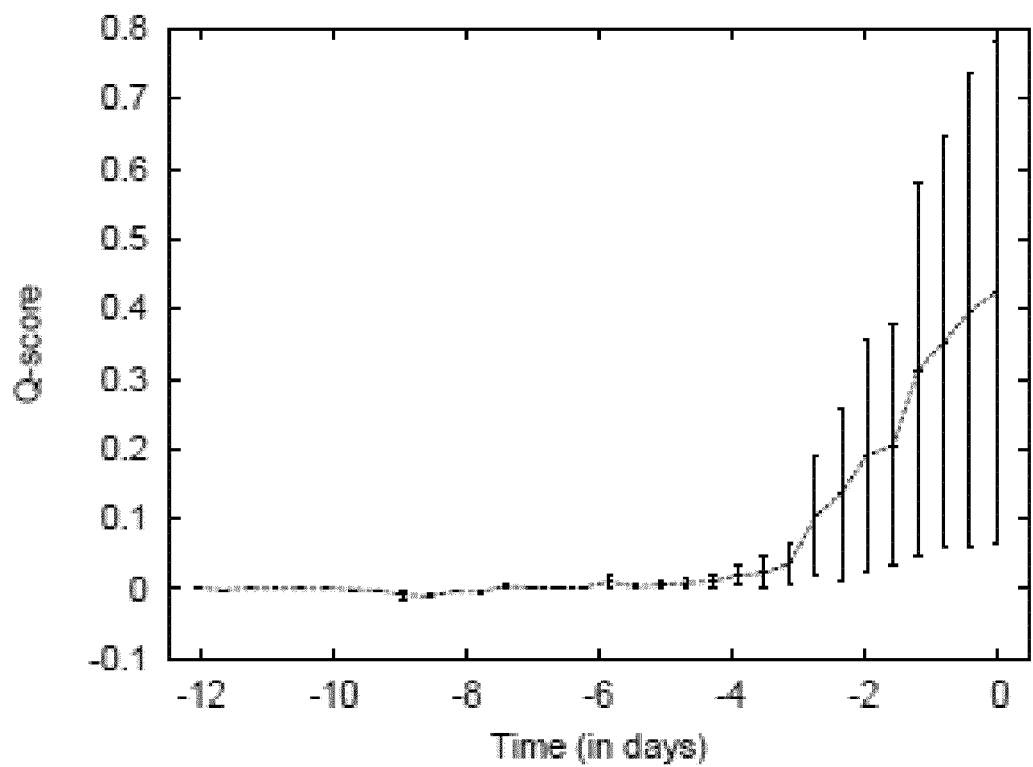

In one embodiment, for Q-score to be used for alerting services, it can have the capability to provide triggers before users start to complain. We can determine how much into the future we can infer user complaints using Q-score. To understand the feasible level of proactiveness in Q-score, we have in this example evaluated two characteristics: (i) the growth pattern of Q-score over time and (ii) the stability of Q-score with time gap between network events and user feedback. FIG. 10 shows the growth pattern of Q-score for individual user IDs who filed trouble tickets. In the figure, we align the time by the trouble ticket filing time (time=0) and observe how Q-score grows. The solid line represents the average value of the scores and the upper and lower tips of error bars represent one standard deviation plus and minus the average. From the graph, we observe that the increase of average Q-score is close to linear when it is greater than 0.05. The monotonic and gradual increase of Q-score indicates the usability of Q-score as a proactive trigger for alerting because (i) it keeps increase once it becomes non-negligible level and (ii) its growth is not too abrupt. However, due to great variance among different users' Q-scores, we may not desire to use Q-score of 0.05 as the significant value triggering forthcoming actions.

Figure 11A:
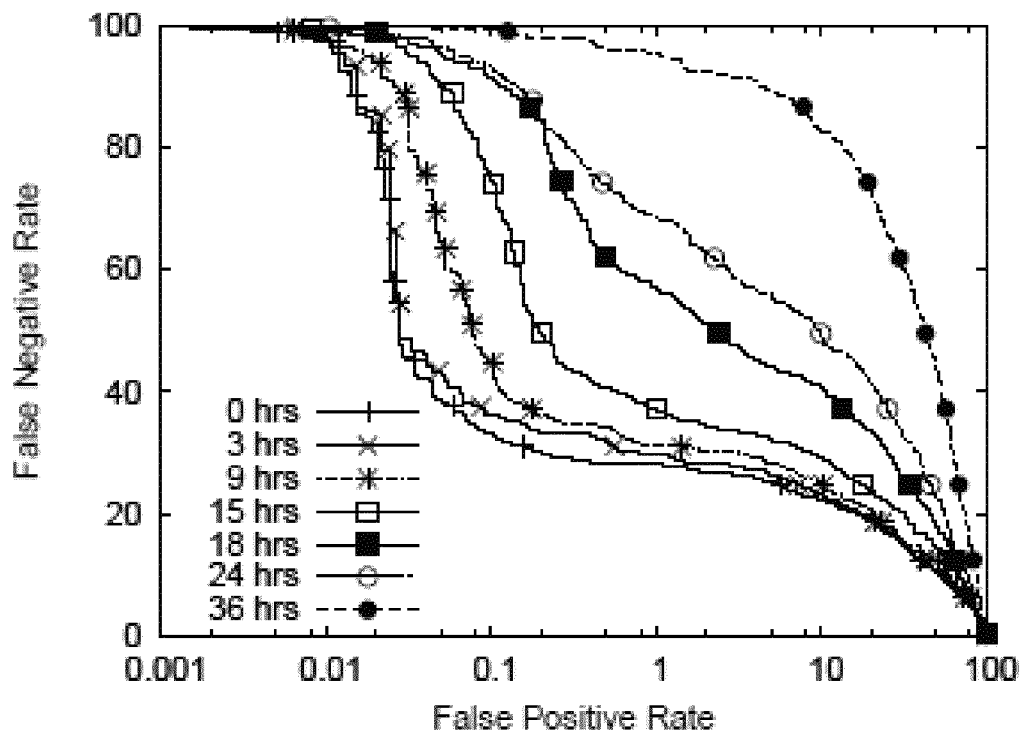

In the example, we may test for the stability of Q-score by skipping time interval between the occurrence times of network events b, and user feedback $c_i$. The default time gap (or skipping interval) between $s_i+\delta$ and $u_i$ is 0 hour because we set $u_i=s_i+\delta$. In this test, we add time gap $\tau$ to the equation $u_i=s_i+\delta+\tau$. By increasing $\tau$ in online monitoring step of Q-score generation, we test for the stability of Q-score in proactive, early warning. With various $\tau$ ranging from 0 hours to 36 hours, FIG. 11a exhibits FPR-FNR of learned $\beta$ with different skipping times. As we increase $\tau$, we observe that FPR-FNR trade off gets worse. While the choice of lead time may be at the discretion of network administrators, we find in this example that hours of lead time is at the feasible level observing 9 hours of skip interval preserves 0.1% of FPR only sacrificing 10% of FNR (e.g., FNR is 30% when skip interval is 0 hours and 40% when skip interval is 9 hours).

If network problems occur locally to regional service areas rather than globally impacting the entire service regions at once, an efficient management of field operators (e.g., customer care representatives and repair men at customer premises) and servicing resources (e.g., devices for fine-grained monitoring of network) can be to dynamically allocate them to challenging service regions than assigning static work areas. Thus, predicting the volume of forthcoming issues to a service region at a given time can be beneficial in adaptively allocating workforce across service regions. In this exemplary application of the Q-score methodology, we can assess the possibility of pre-allocating customer care workforce to potentially troubling service areas using Q-score. To begin, we can first assess the volume of service quality issues per different spatial regions and see if the issues are contained locally or spread out globally.

Figure 11B:
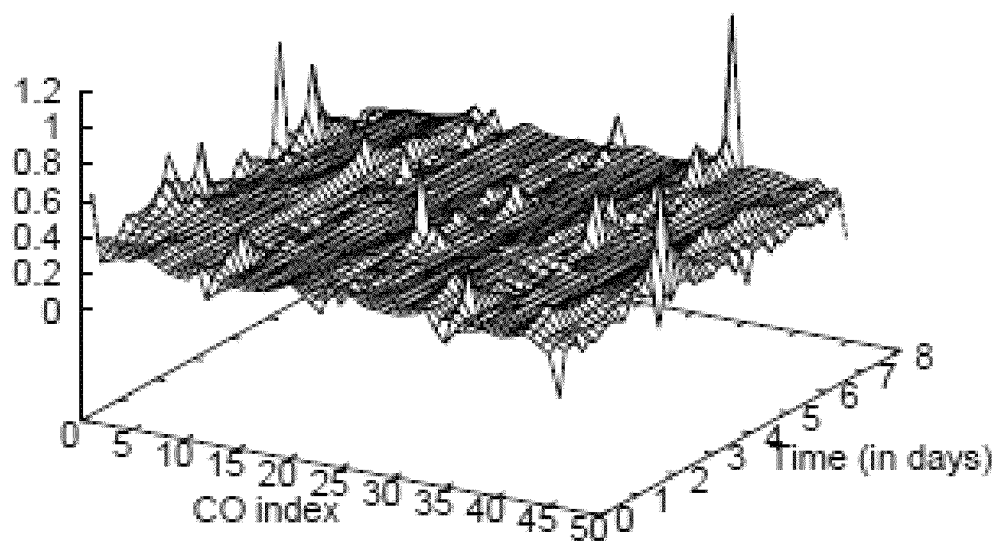

FIG. 11b shows spatial distribution in the example of user feedback across different COs. X-axis shows indexes of different COs, z-axis shows temporal trend, y-axis shows the percentage of user complaints (e.g., value of 1 represents that 1% of users in the CO have complained on a given time). At a given time, we observe that high user feedback is local to each CO. Over time, the areas of high user feedback can change from one CO to another. From the fact that high feedback values generally being uncorrelated across time and CO (or space), it is indicated that the issues are temporal rather than permanent and local to an area rather than being global.

Figure 12A:
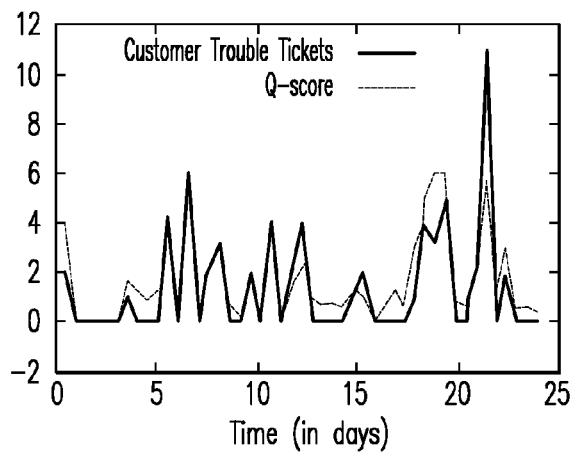
Figure 12B:
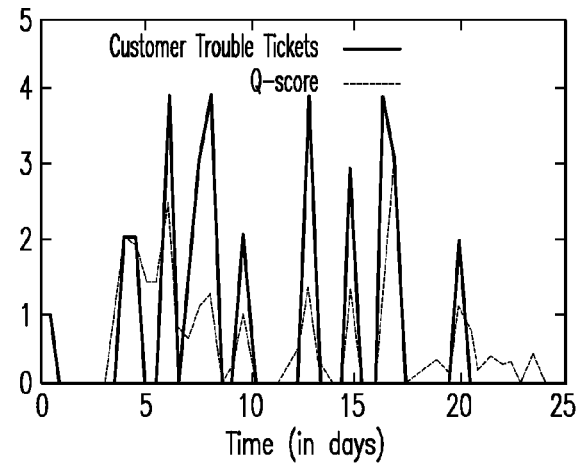
Figure 12C:
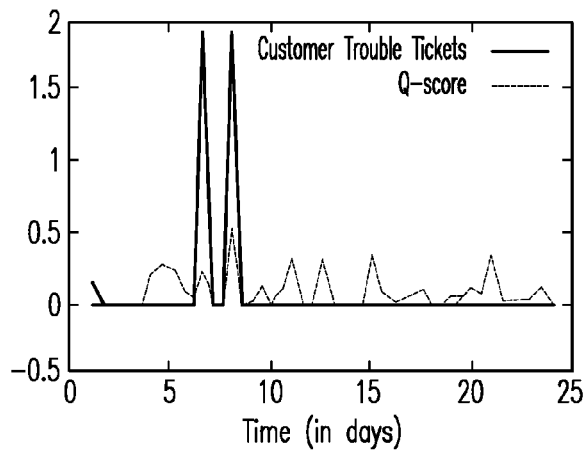

Now that we have seen the possibility of dynamic resource allocation over different COs, we can evaluate how closely Q-score follows user feedback in its magnitude when aggregated across individuals within each COs. Note that, to focus on its similarity to user feedback rate, we can ignore the lead time of Q-score in this test. FIGS. 12a-c show the trend of Q-score and user feedback aggregated per-CO. In doing so, Q-scores of individual user ID are first computed, and the scores corresponding to individuals within each CO are aggregated together to form per-CO Q-score. FIG. 12a shows the trend of per-CO Q-score and user feedback for a CO with relatively high customer feedback (e.g., complaints). Over the course of 24 days, the percentage of users with complaints shown on the y-axis gets as high as 11%. Despite that there are some overestimations, the general trend of per-CO Q-score closely follows that of user feedback. FIG. 12b shows per-CO Q-score and user feedback for COs with moderately high complaints. We again see that the Q-score follows feedback whenever feedback increases over 2%. FIG. 12c shows the same for a CO with low customer complaints. Because there are only small increase (2% of users complaining) in the user feedback, Q-score remains at low level of 0.17% on average. From the observations from three different COs with high, medium, and low level of feedback, it is indicated that Q-score, when aggregated across individuals within each CO, closely follows the trend of per-CO user feedback. Since Q-score is indicated in this example as having several hours of lead time before users begin to complain, we can leverage Q-score in dimensioning workforce and prioritizing resources to areas with more upcoming issues ahead of time.

In one embodiment, a combination of data mining, lab reproduction, and/or software/hardware analysis can be utilized to correctly identify anomalous service quality. While the example described above, uses the customer trouble ticket as a proxy for user feedback, the methodology can employ a variety of video quality metrics as the measure of user experience. By associating coarse-grained network KPIs with imperfect user feedback, Q-score can generate a score (e.g., a single score) that represents user-perceived quality of experience.

Accuracy analysis of Q-score in the example described above reveals that it is able to predict 60% of service problems reported by customers with only 0.1% of false positive rate. Applying Q-score to various application scenarios, we have: (i) identified a set of KPIs most relevant to user-perceived quality of experiences; (ii) quantified how early it can alert bad quality of experience; (iii) observed possibility to pre-allocate customer care workforce to potentially troubling service areas. There are many other network services that are sensitive to service quality but lack objective measures of user-perceived quality of experience. The proactive service quality assessment of the exemplary embodiments can be applied beyond the specific context of an IPTV network. For example, the Q-score system can be applied to VoIP and/or mobile networks so that operation teams can predict user distress over call drops and voice quality degradation without having to wait for customers to complain.

FIG. 13 depicts an illustrative method 1300 that operates in portions of the devices of FIGS. 1-2a. Method 1300 can begin at 1302 in which performance indicators are collected or otherwise obtained from network elements including routers and/or switches. Data can be collected from other network elements including DSLAMS, servers and so forth. The performance indicators can be of various types and can be obtained based on various types of data from various sources including SNMP MIBs, logs and so forth. At 1304, customer performance indicators, including premises or home performance indicators, can be collected or otherwise obtained from customer equipment, including customer premises equipment such as STBs and RGs. These performance indicators can be of various types and can be obtained based on various types of data from various sources including event logs, syslogs and so forth.

At 1306, user activity information can be collected or otherwise obtained, such as power status, channel switching, video streaming control and/or screen menu invocation. At 1308, customer feedback, such as premises feedback from tickets, customer call service records and so forth, can be collected or otherwise obtained.

At 1310, a relationship between the customer feedback (e.g., customer complaints) and the collected data (e.g., network and premises performance indicators and user activity information) can be determined. In one embodiment, regression analysis can be utilized to quantify the relationship via generating regression coefficients. At 1312, 1314 and 1316, a second set of data (e.g., network performance indicators, customer performance indicators, and/or user activity information) can be collected or otherwise obtained via a monitoring process. In one embodiment, the monitoring process can be a continuous and/or real-time process.

At 1318, customer complaints or other undesired perception can be predicted based on the determined or quantified relationship obtained at 1310. For example, regression coefficients can be applied to the second set of data that has been collected to predict whether portions of the data is indicative of forthcoming customer complaints. At 1320, the prediction information can be utilized for allocating or adjusting personnel to better manage the predicted complaints. For example, the number of customer call representatives on duty can be increased in order to handle a predicted increase in call volume. In another embodiment, field technicians can be alerted as to the potential service areas, including dispatching the field technicians (e.g., to a more proximate service facility) in anticipation of the predicted customer complaints.

Upon reviewing the aforementioned embodiments, it would be evident to an artisan with ordinary skill in the art that said embodiments can be modified, reduced, or enhanced without departing from the scope and spirit of the claims described below. For example, the embodiments can be utilized to dynamically identify key performance indicators to be monitored by other systems.

In one or more embodiments, aggregation of the fixed-size time interval data can be based on one or more of a minimum value, a maximum value and/or an average value for use in the statistical regression analysis. In one or more embodiments, other metrics can be selected and utilized in the statistical regression analysis, including in the aggregation of the fixed-size time interval data, with or without utilizing the minimum value, the maximum value and/or the average value. Other embodiments are contemplated by the present disclosure.

Figure 14:
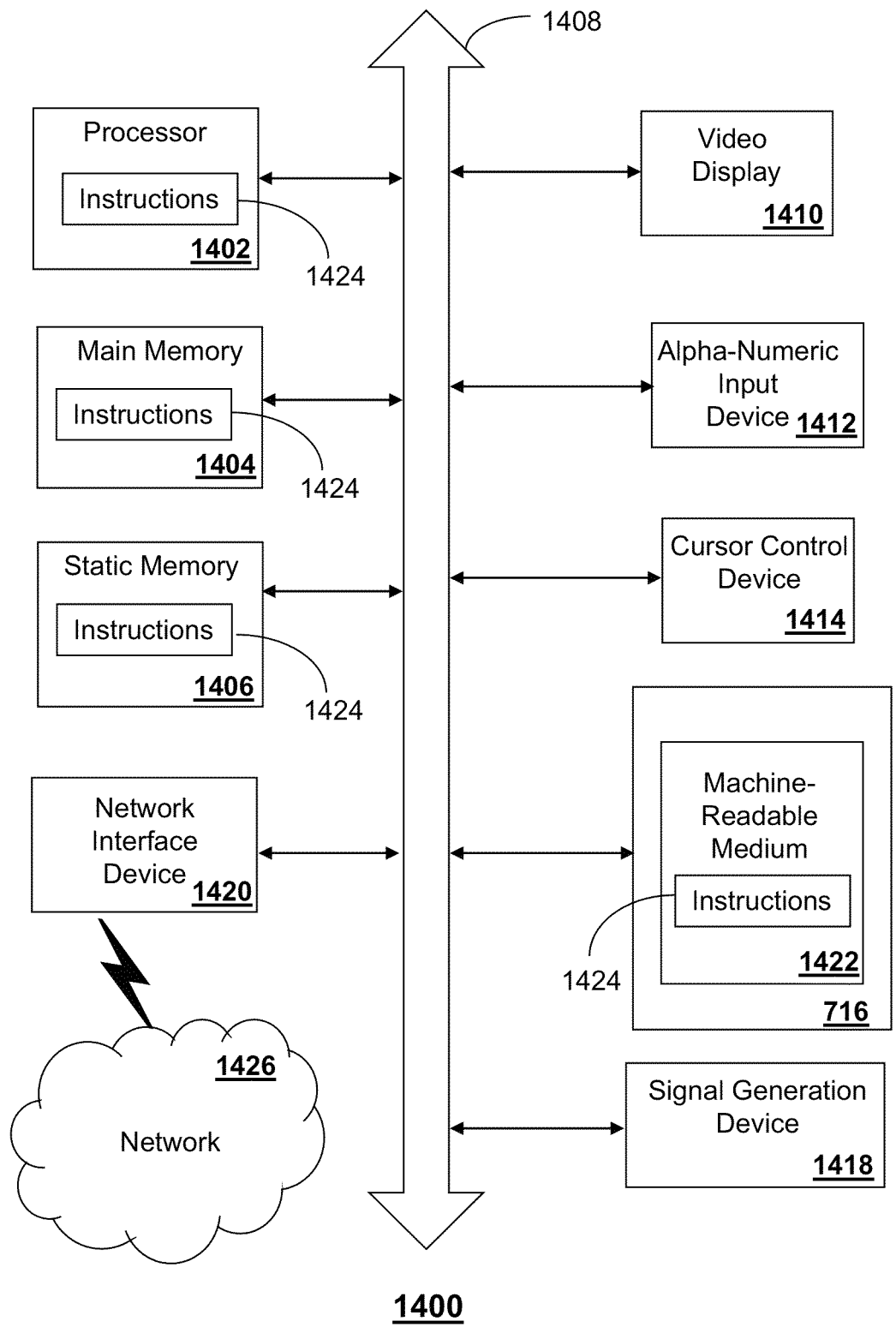
FIG. 14 is a diagrammatic representation of a machine in the form of a computer system within which a set of instructions, when executed, may cause the machine to perform any one or more of the methods discussed herein.

FIG. 14 depicts an exemplary diagrammatic representation of a machine in the form of a computer system 1400 within which a set of instructions, when executed, may cause the machine to perform any one or more of the methods discussed above. One or more instances of the machine can operate, for example, as the server 130, the media processor 106, the gateway 104, the mobile device 116, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor or controller circuit 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, or a solid state display. The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Components and/or functionality described with respect to one or more embodiments can be interchangeable or otherwise used with components and/or functionality described with respect to another embodiment. Similarly, steps of the methods and processes described herein can be performed sequentially, simultaneously, overlapping and/or according to other timing.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising a memory storing computer instructions and being coupled with a controller circuit which when executing the computer instructions performs operations comprising:

obtaining first network performance indicators for routers and switches of a network, wherein the first network performance indicators comprise first processor utilization, first packet count, first packet delivery errors and first discards;

obtaining first premises performance indicators for set top boxes and residential gateways coupled with the network, wherein at least some of the routers and switches are used in delivering services to the set top boxes;

obtaining first user activity information for the set top boxes;

obtaining premises feedback from complaint information of customer call service records associated with at least some of the set top boxes;

determining regression coefficients that quantify a relationship between the premises feedback and the first network and premises performance indicators by utilizing statistical regression analysis on at least the first network performance indicators, the first premises performance indicators, the first user activity information and the premises feedback;

obtaining second network performance indicators for the routers and the switches, wherein the second network performance indicators comprise second processor utilization, second packet count, second packet delivery errors and second discards;

obtaining second premises performance indicators for the set top boxes and the residential gateways;

obtaining second user activity information for the set top boxes; and predicting customer complaints by applying the regression coefficients to at least the second network performance indicators, the second premises performance indicators and the second user activity information.

2. The server of claim 1, wherein the controller circuit is programmed to generate workforce allocation information that is usable by a service provider for allocating personnel to address potential service issues associated with the predicted customer complaints.

3. The server of claim 2, wherein the workforce allocation information indicates services areas associated with the predicted customer complaints.

4. The server of claim 1, wherein the first premises performance indicators for the set top boxes comprise at least one of first video throughput, first receiver transport stream errors, first codec errors, first digital rights management errors, first viewing duration of channels, first program message logs or first event logs, and wherein the second premises performance indicators for the set top boxes comprise at least one of second video throughput, second receiver transport stream errors, second codec errors, second digital rights management errors, second viewing duration of channels, second program message logs or second event logs.

5. The server of claim 1, wherein the first premises performance indicators for the residential gateways comprise first reboot logs, and wherein the second premises performance indicators for the residential gateways comprise second reboot logs.

6. The server of claim 1, wherein the first user activity information comprises at least one of first power status, first channel switching, first video streaming control or first screen menu invocation, and wherein the second user activity information comprises at least one of second power status, second channel switching, second video streaming control or second screen menu invocation.

7. The server of claim 1, wherein the controller circuit is programmed to:
   define data points for each of the first network and premises performance indicators based on a metric, a location, a begin time and an end time associated with said first network and premises performance indicators; and
   convert each of the data points to fixed-size time interval data for use in the statistical regression analysis.

8. The server of claim 7, wherein the controller circuit is programmed to aggregate each of the fixed-size time interval data based on at least one of a minimum value, a maximum value or an average value for use in the statistical regression analysis.

9. The server of claim 1, wherein the controller circuit is programmed to:
   define data points for each of the first network and premises performance indicators based on a metric, a location, a begin time and an end time associated with said first network and premises performance indicators; and
   normalize the defined data points to a binary value by comparison with a threshold associated with the metric and location of each of the data points, wherein the normalized defined data points are utilized in the statistical regression analysis.

10. The server of claim 9, wherein the controller circuit is programmed to determine the threshold based on the obtained premises feedback.

* * * * *